United States Patent [19]

Schneider

[11] 4,168,723
[45] Sep. 25, 1979

[54] PRESSURE RELIEF VALVE
[75] Inventor: William H. Schneider, Pittsford, N.Y.
[73] Assignee: Chicago Pneumatic Tool Company, New York, N.Y.
[21] Appl. No.: 852,821
[22] Filed: Nov. 18, 1977
[51] Int. Cl.² ...................... F16K 15/06; F16K 37/00
[52] U.S. Cl. .................................... 137/542; 137/557; 137/614.19
[58] Field of Search ............ 137/542, 557, 382, 614.19
[56] References Cited
U.S. PATENT DOCUMENTS

| 3,702,141 | 11/1972 | Wetterhorn | 137/542 X |
| 3,844,310 | 10/1974 | Brindisi | 137/557 |
| 3,952,691 | 4/1976 | Peltz et al. | 137/557 X |

Primary Examiner—William R. Cline

[57] ABSTRACT

A pressure relief valve for attachment to a tank, such as used on an electrical transformer, which valve will release excessive gas pressure developed in the tank because of transformer malfunction. The valve has a cap which uncovers a signal indicating portion of the valve when the valve is unseated during a pressure release operation. The cap remains in signal uncovered position, after the valve resets, to warn maintenance personnel that the tank has had an excessive pressure condition.

6 Claims, 4 Drawing Figures

PRESSURE RELIEF VALVE

BACKGROUND OF THE INVENTION

The valve of this invention is applied to a container for automatic release of excessive pressure developed within the container. It is designed especially for use on a tank of a fluid type electrical transformer as generally mounted on a pole located outdoors. When overheated, gases are developed in the tank which may build up to an undesirable and dangerous high pressure. The valve of the invention is operative to release such excessive pressure from the tank, and to signal that the valve has so operated. In such manner, maintenance personnel will be alerted to the fact that the transformer may be in need of corrective action.

Various valves have been designed to accomplish the basic objective of the subject invention, such as disclosed in U.S. Pat. No. 3,844,310, issued on Oct. 29, 1974, to Frederick J. Brindisi.

The device of the subject invention represents an improvement in the art insofar as it is extremely simple in structure, reliable in operation, and incorporates a bug shield which at all times prevents entry of foreign, or contaminating material into the valve before and after pressure relief operation.

DESCRIPTION OF PREFERRED EMBODIMENT

Figure 1:
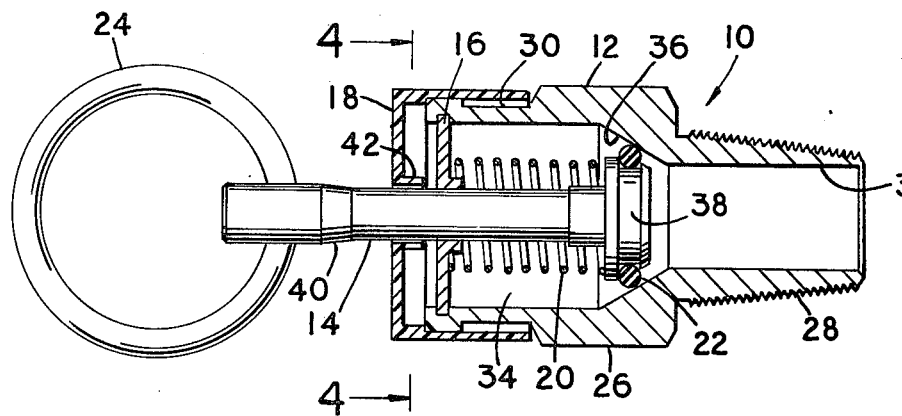
FIG. 1 is a sectional view of a pressure relief valve illustrative of an embodiment thereof and showing position of movable parts prior to pressure relief action.

A pressure relief valve 10 of the invention includes a body 12, a valve plunger 14, a retainer 16, a cap 18, a helical spring 20, an "O" ring 22, and a pull ring 24.

The body 12 is generally cylindrical in form and has a hexagonal mid-portion 26 affording a wrench gripping surface, and a threaded tapered end portion 28 for mounting the valve in operative position upon a tank (not shown). Adjacent the mid-portion 24 is a signal indicating portion 30, the exterior surface being brightly colored, such as with a red automotive acrylic lacquer. A passageway 32 extends through the tapered end portion 28 and opens into an enlarged cavity 34 having a tapered valve seating surface 36.

The plunger 14 has an enlargement 38 at the forward end providing mounting means for the "O" ring 22, the latter being composed of synthetic rubber, or other material as commonly used for valve seals. Toward the opposite end of the plunger, a tapered surface 40 provides a diameter increase of approximately 0.010 inches.

The retainer 16, which is secured in the end region of the cavity 34, serves a two-fold purpose, namely, to provide a guide for axial movement of the plunger 14, and to maintain the spring in compression between the plunger enlargement 38 and the retainer. The degree of spring compression is selected to maintain the "O" ring 22 seated upon the valve seating surface 36 until a predetermined pressure is generated in the tank.

The cap 18, which is preferably made from a black polypropylene material, is arranged to slidingly fit upon the signal indicating portion 30, and is provided with an inturned bearing surface 42 for sliding engagement with the body of the plunger. The cap prevents bugs or other foreign matter from entering the body of the valve.

The pull ring 20 is secured to the end of the plunger 14 for hanging engagement therewith. It is used for manually unseating the valve ring 22 from the seat 36 when the tank is checked for pressure condition.

Referring to FIG. 1, the valve is illustrated with the movable parts in position prior to a pressure relief operation. It will be noted that the valve "O" ring 22 is seated, and the cap 18 completely covers the signal indicating portion 30 of the valve.

Figure 2:
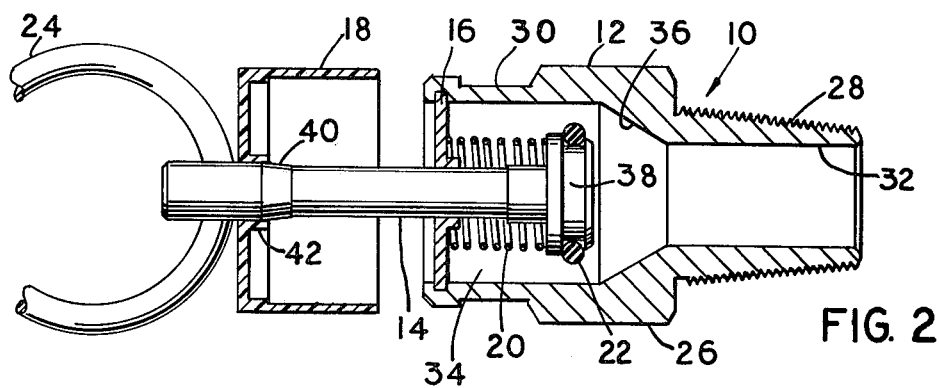
FIG. 2 is the same but illustrating the position of the movable parts during pressure relief operation.

FIG. 2 shows the position of the movable parts at the time of a pressure release action. It will be noted that the valve "O" ring 22 has been unseated by excessive predetermined pressure condition in the tank to which the valve is affixed. The sudden outflow of pressurized medium has forced the cap 18 rearwardly so that the inturned bearing surface 42 is forced passed the tapered surface 40 of the plunger 14, where it remains because of the negative fit upon the increased diameter surface of the plunger. In such position of the cap, the valve signal indicating portion is uncovered.

Figure 3:
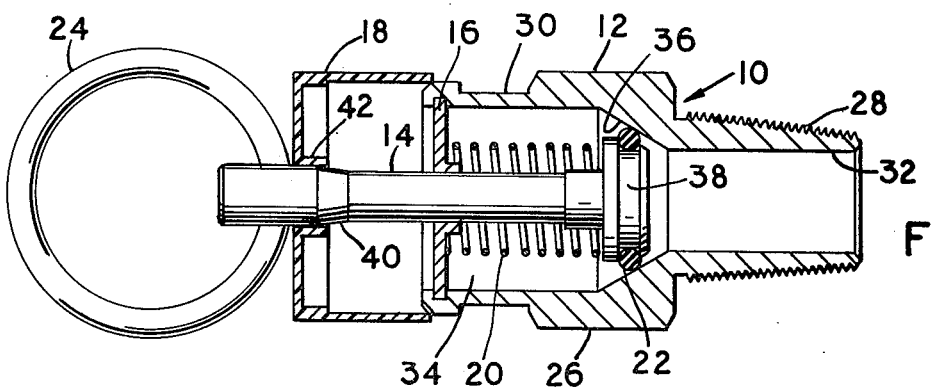
FIG. 3 is the same but illustrating the position of the movable parts after completion of a pressure relief operation.
Figure 4:
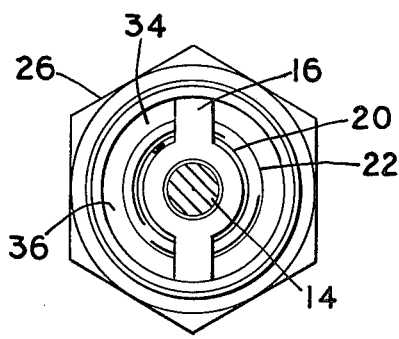
FIG. 4 is a section view as seen from line 4—4 in FIG. 1.

When the pressure in the tank returns to predetermined pressure value, the spring 20 forces the valve "O" ring back into seated condition on the valve seating surface 36, as illustrated in FIG. 3. It will be seen that the cap 18 will remain in the position on the plunger to which it was forced during pressure relief operation, thus continuing exposure of the signal indicating portion 30; however, the interior of the valve will be enclosed since the forward edge of the cap will be in contact with the end of the signal indicating portion. Subsequent unseating of the valve will, of course, be possible without a change in the FIG. 3 condition.

In the FIG. 3 valve condition, maintenance personnel will be alerted to the fact that the valve has operated to allow release of excessive pressure in the tank. After investigating and taking whatever corrective action is called for, the cap 18 is manually moved back to original position as shown in FIG. 1.

I claim:

1. A pressure relief valve comprising in combination, a valve body (12) having a threaded end (28) for mounting the valve upon an enclosure containing pressurized medium, a valve plunger (14) having a valve seating means (22, 38) at one end engageable with a valve seating surface (36) formed in the valve body to prevent release of pressurized medium from the enclosure and a tapered surface (40) which expands into a maximum diameter portion positioned near the other end of the plunger, a cap (18) slidingly supported upon the valve plunger and having a bearing surface (42) which is of less diameter than the maximum diameter portion of the tapered surface, a retainer (16) secured to the valve body and slidingly supporting the valve plunger, said retainer being arranged to allow flow of pressure medium thereby and into the cap, and a helical spring (20) compressively arranged between the plunger valve seating means and the retainer so that the valve is biased to seated condition, said valve body having an exterior signal surface (30) which is covered by the cap when the valve seating means is contacting the valve seating surface and is uncovered by the cap when the cap is moved by pressurized medium during pressure relief operation, and the cap bearing surface is forced upon the maximum diameter portion of the tapered surface.

2. A pressure relief valve according to claim 1, wherein the cap will be restricted against sliding upon the plunger after the cap bearing surface is forced upon the maximum diameter portion of the plunger during a valve pressure relief operation whereby the valve body signal surface will remain uncovered by the cap.

3. A pressure relief valve according to claim 2, wherein the cap is of cylindrical form having an enclosure at one end in which the bearing surface is arranged, the other end of the cap being arranged in snug engagement with the valve body in any axial position of the cap to prevent foreign material from entering the valve.

4. A pressure relief valve according to claim 3, wherein a hexagonal portion is arranged between the threaded end and the exterior signal surface of the valve body to provide a wrench gripping surface for the valve.

5. A pressure relief valve according to claim 4, wherein a pull ring is affixed to the end of the plunger whereby the valve seating means can be manually unseated from the valve seating surface.

6. A pressure relief valve according to claim 1, wherein a brightly colored acrylic lacquer is used to define the signal surface.

* * * * *

UNITED STATES PATENT OFFICE
CERTIFICATE OF CORRECTION

PATENT NO. : 4,168,723
DATED : September 25, 1979
INVENTOR(S) : William H. Schneider It is certified that error appears in the above-identified patent and that said Letters Patent are hereby corrected as shown below:

Change assignee from "Chicago Pneumatic Tool Company, New York, N. Y. " to -- Qualitrol Corporation, Fairport, N. Y."--

In the Abstract, line 8, change "resets" to --reseats"

Signed and Sealed this

Eleventh Day of December 1979

[SEAL]

Attest:

SIDNEY A. DIAMOND

Attesting Officer     Commissioner of Patents and Trademarks